(No Model.)

C. A. WHITNEY.
FURNITURE CASTER.

No. 309,273. Patented Dec. 16, 1884.

WITNESSES:
C. S. Gooding.
W. R. Marble

INVENTOR:
Charles A. Whitney,
By Sylvenus J. Walker
Attorney

UNITED STATES PATENT OFFICE.

CHARLES A. WHITNEY, OF WALTHAM, MASSACHUSETTS.

FURNITURE-CASTER.

SPECIFICATION forming part of Letters Patent No. 309,273, dated December 16, 1884.

Application filed April 7, 1884. (No model.)

*To all whom it may concern:*

Be it known that I, CHARLES A. WHITNEY, of Waltham, in the county of Middlesex and State of Massachusetts, have invented certain new and useful Improvements in Furniture-Casters, of which the following is a specification.

The object of my improvement is to provide a cheap, simple, convenient, and efficient caster, which shall more readily swivel about its vertical axis, or with less friction, than those heretofore constructed; and it consists in the construction and arrangement of the journal or axis of the wheel on an incline to the vertical axis of the caster-frame or horizontal bearing upon which the periphery of the caster-wheel moves in use, and having the bearing of the vertical pivot or axle of the wheel-frame arranged in the vertical plane extending through the periphery of the wheel at a short distance from its bearing or tread, and near its incline axle, as hereinafter more fully described, and specifically set forth in the claim.

Figure 1:
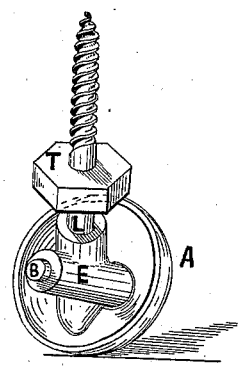
Figure 3:
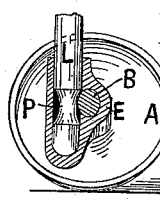
Figure 2:
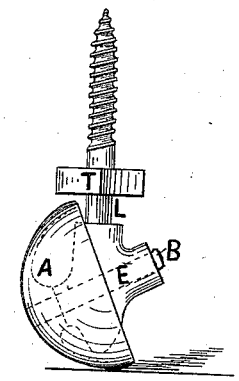
Figure 4:
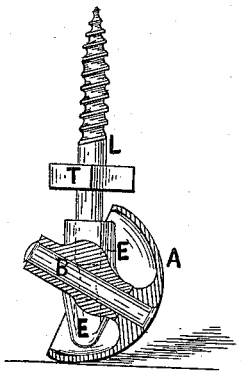

Figure 1 represents a perspective view of a caster constructed according to my invention. Fig. 2 represents a sectional elevation of the same. Fig. 3 represents a side elevation of the caster. Fig. 4 represents a sectional elevation.

A represents the wheel, which is cup-shaped, having a concave side and a corresponding convex side, and provided centrally with an axle, B, which has an incline bearing, and rotates in the frame E at an angle of about thirty degrees from the horizontal plane, and said frame E is provided with a vertical screw or pivot, L, bearing at an angle of about sixty degrees to the former, said pivot L having a bearing at its lower end within a step formed in said frame E at one side of the said incline axle B and a short distance below the same, which axle B passes through a groove, P, formed around the said vertical pivot L, near the lower end thereof, and by which means the said vertical pivot L is retained in its position within the said frame E, its upward end portion being provided with a screw-thread whereby the caster may be secured to the leg of furniture or other article desired by screwing the said pintle L into the same by applying a wrench to the hexagonal or other angle-faced nut, projection, or collar T, formed upon or attached to the shank or body portion of the said attaching pintle or pivot L, as shown. It will be seen and understood that, if desired, the said pivot or pintle L may be connected to the said frame portion E rigidly, and have a bearing provided at its upper end within a socket; or it may have a pivot-bearing formed within a plate provided with screw-holes to permit of attachment thereby; or a flanged socket may be employed, as heretofore, for securing the common caster upon furniture; or any other suitable connecting devices may be employed without departing from the essential features of my invention. It will be seen in Figs. 2 and 4 that the line of the vertical axis intersects the line of the bearing of the periphery of the wheel at or near the axis of the said wheel, so as to cause the same to swivel or rotate horizontally about said vertical axis in a very efficient manner, or with very slight friction.

Having thus described my invention, what I claim is—

A furniture-caster provided with a pivotal bearing-support, and having its vertical pivot extended below the incline axle of the wheel, and provided with a groove, within which the said axle passes, whereby the said pivot is retained in position, as described.

CHARLES A. WHITNEY.

Witnesses:
SYLVENUS WALKER,
CHAS. S. GOODING.